(No Model.)

A. H. SCHIERHOLZ.
AIR VALVE FOR WATER PIPES.

No. 557,343. Patented Mar. 31, 1896.

Witnesses:

Inventor,
August H. Schierholz
By Dewey & Co
Attys

UNITED STATES PATENT OFFICE.

AUGUST H. SCHIERHOLZ, OF SAN FRANCISCO, CALIFORNIA.

AIR-VALVE FOR WATER-PIPES.

SPECIFICATION forming part of Letters Patent No. 557,343, dated March 31, 1896.

Application filed October 16, 1895. Serial No. 565,892. (No model.)

*To all whom it may concern:*

Be it known that I, AUGUST H. SCHIERHOLZ, a citizen of the United States, residing in the city and county of San Francisco, State of California, have invented an Improvement in Air-Valves for Water-Pipes; and I hereby declare the following to be a full, clear, and exact description of the same.

My invention relates to that class of air-valves on water-pipes which prevent the accumulation of air in high points of pipe-lines, and which accumulation of air would seriously interfere with the free flow of the water through the pipes, and also to a mechanism which allows the air to enter the pipe in case of breakage in lower places of the pipe-line, thus preventing a consequent collapsing of the pipe through the vacuum so formed.

It consists in certain details of construction which will be more fully explained by reference to the accompanying drawings, in which—

Figure 1:
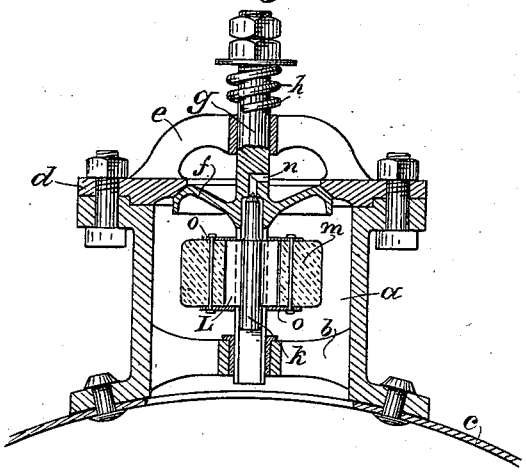
Figure 2:
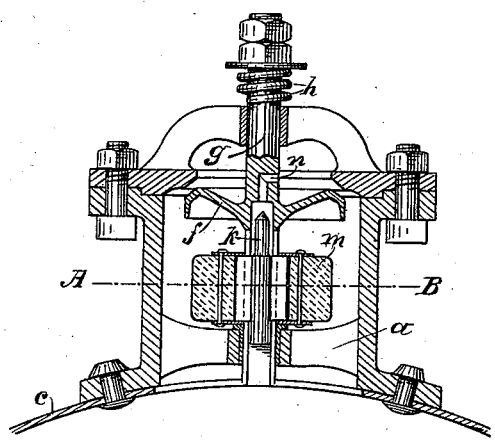
Figure 3:
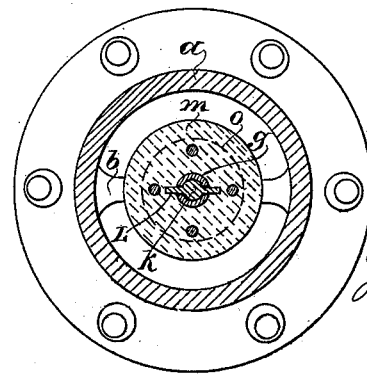

Figure 1 is a vertical section through the closed valves, showing the valve connected to a water-pipe. Fig. 2 is also a vertical section through same line as Fig. 1, but with the valves open. Fig. 3 is a horizontal section through line A B of Fig. 2.

$a$ is the valve-casing with guide-bridge $b$ cast in and bolted or riveted to the water-pipe $c$, of which latter only a small section is shown.

$d$ is the cover, with guide-bridge $e$ cast on it, forming also the seat for the large air-inlet or vacuum valve $f$. This large air-inlet valve has a stem $g$ at the upper end, which is guided in the bridge $e$ and provided with adjusting-nuts and washer, under which latter is a light spiral spring $h$, resting on the guide-bridge $e$. The lower end of the large inlet-valve stem is bored and slotted, the bored part to serve as a guide for a small air-escape valve $l$, which is movable within it, and the slotted part to allow a pair of wings L, which are made in one piece with the valve $l$, to pass freely through each side and be connected to a float $m$, of light material—as cork, rubber, or a bell-shaped vessel of light metal—by their plates $o$ overlapping their ends and secured to the float by light bolts passing through the float. Through the seat of the small valve runs a small opening $n$, communicating with the open air. When the water-pipe $c$ is empty, the small escape-valve $l$ is open, and the float $m$, to which it is connected, rests on the guide $b$. The large air-inlet valve is also a little open, its weight being nearly balanced by the spiral spring $h$, as shown in Fig. 2. Now if water is let into the pipe $c$, the valve being connected to the highest part of the pipe-line, the air contained in the pipe will escape through both valves, and after the water reaches the float L it will lift it and close it, the water still rising in the casing $a$ until it commences to escape through the large valve $f$, which will then close immediately on account of the friction of the water on the edge of the valve. The large valve will remain closed as long as there is any pressure in the pipe, but will open wide and air will rush in if a vacuum should form on account of breakage in the lower part of the pipe-line or other cause, so preventing a collapsing of the pipe. If, on the other hand, water is run through the pipe, both valves being closed, as in Fig. 1, and air should accumulate, the float $m$, with its small valve $l$, will sink with the surface of the water when air accumulates to a certain quantity, and the air will escape through the small opening, so preventing the accumulation of air in the pipe. The device is thus automatic in its action for both purposes.

Having thus described my invention, what I claim as new, and desire to secure by Letters Patent, is—

1. A water-pipe having an inwardly-opening air-inlet or vacuum valve provided with a hollow and slotted stem, in combination with a supplemental air-escape valve slidable within the hollow of said stem and having wings working in the slotted portion thereof, and a float carried by the wings and surrounding both the escape-valve and hollow stem of the air-inlet valve.

2. In an air-inlet for water-pipes, the combination, of an inwardly-opening air-inlet or vacuum valve and a supplemental air-escape valve, one of said valves having a hollow and slotted stem and the other slidable in said stem and having wings working in the slotted portion thereof, and secured to a float, each of said valves opening and closing independently of the other.

3. The combination, of an inlet-valve, having a stem projecting above and below, the lower portion of the stem being hollow and slotted and the upper portion having a passage leading to the open air, an escape-valve within the hollow of the stem and controlling said passage, and having wings working in the slotted portion thereof, and a float concentric with the escape-valve and secured to said wings.

4. A casing with a valve-seat fixed to a water-pipe and having guide-bridges, a valve closable against the seat having a hollow stem passing through and guided by the bridges with an opening to the exterior air, a second valve by which said opening is controlled, said valve being slidable within the stem of the main valve.

5. A water-pipe with a valve-casing fixed thereto, a seat within the casing, an air-inlet valve closing outwardly against the seat, with a hollow stem movable in guides fixed to the casing, a passage connecting the interior of the stem with the open air, and radial slots through the stem interior to the valve, a supplemental valve slidable within the stem and controlling the discharge-passage thereof, wings projecting from said valve through the slots in the outer stem, and a float movable in the outer casing, with which the wings and inner valve are connected.

6. An inwardly-opening vertically-movable valve, a casing containing the valve with guides through which the valve-stem is slidable, a radially-slotted chamber within the stem, having a passage therefrom to the outer air, a valve movable within the chamber controlling said passage, wings extending from the valve through the radial slots of the stem, a float exterior to the stems with which the wings and valve are connected and movable, a spring surrounding the upper end of the main valve-stem, resting upon the top guide, with nuts adjustable upon the stem and resting upon the spring.

In witness whereof I have hereunto set my hand.

AUGUST H. SCHIERHOLZ.

Witnesses:
S. H. NOURSE,
WM. F. BOOTH.